United States Patent

Seiber et al.

[15] 3,673,190
[45] June 27, 1972

[54] CHLORINATED PYRIDYLACETYLENE COMPOUNDS

[72] Inventors: James N. Seiber, Davis; Vernon D. Parker, Oakland, both of Calif.

[73] Assignee: The Dow Chemical Company, Midland, Mich.

[22] Filed: Jan. 21, 1970

[21] Appl. No.: 4,757

[52] U.S. Cl.................260/290 HL, 260/290 V, 260/651 R, 260/650 R, 71/94, 71/126, 204/72
[51] Int. Cl. .......................................................C07d 31/26
[58] Field of Search ................................260/290 HL, 290 V

[56] References Cited

UNITED STATES PATENTS 3,045,022   7/1962   McGill..............................260/290 V Primary Examiner—Henry R. Jiles
Assistant Examiner—S. D. Winters
Attorney—Griswold and Burdick, Herbert D. Knudsen and C. E. Rehberg

[57] ABSTRACT

Trichlorovinylaromatic compounds having the general formula

Ar—(CCl  CCl$_2$)hd p wherein Ar is perchlorinated phenyl or perchlorinated pyridyl and
p is an integer of 1 to 3 are dehalogenated and reduced by electrolysis to give an aromatic acetylene compound having the general formula Ar'—(C  CH)$_p$ wherein Ar' is the original aromatic nucleus or the original aromatic nucleus containing fewer chlorine atoms. Such compounds are useful to control rice blast.

5 Claims, No Drawings

3,673,190

CHLORINATED PYRIDYLACETYLENE COMPOUNDS

BACKGROUND OF THE INVENTION

Feoktistov and Tomilov in USSR Pat. No. 158,869 (1963) C.A. 60, 11,894 (1964) show a method of preparing ethylene from iodochloroethane and a method of preparing 2-chloro-1,1-difluoroethylene from 1,1,1-trifluoro-2-chloro-2-bromoethane by means of an electrochemical dehalogenation. Halogenated ethane was the only substrate used in the patent and the product contained only ethylenic unsaturation.

Zinc has been used to prepare acetylenic compounds. Weis in Helv. Chim. Acta. 49, 234 (1965) describes a method for dehalogenating 1,1,2,2-tetrachloro-1,2-bis(4-chlorophenyl)ethane by contacting the compound with zinc in boiling dimethylformamide to form bis(4-chlorophenyl)acetylene. Finnegan and Norris in J. Org. Chem. 28, 1139 (1963) show a method of preparing 3,3,3-trifluoropropyne by reacting 1,1,2-trichloro-3,3,3-trifluoropropene with zinc dust in the presence of a suitable solvent. The yield of the acetylenic compound varied from 12 to 32 percent.

SUMMARY OF THE INVENTION

The present invention is a new process and new chloropyridylacetylene compounds prepared by dehalogenating and reducing trichlorovinylaromatic compounds having the general formula $Ar—(CCl = CCl_2)_p$ wherein Ar is perchlorinated phenyl or perchlorinated pyridyl and $p$ is an integer of 1 to 3 by electrolysis to produce an aromatic acetylene compound having the general formula $Ar'—(C \equiv CH)_p$ wherein Ar' is the original aromatic nucleus, or the original aromatic nucleus containing fewer chlorine atoms.

The novel features of the present invention are the new chloropyridylacetylenes and the utilization of an electrolysis reaction to convert a perchlorinated vinylaromatic compound to a corresponding aromatic acetylene compound. Although the aromatic compounds of the invention may contain up to three perchlorovinyl groups, those compounds containing only one such vinyl group, i.e. where $p = 1$ in the general formula, are preferred.

The new chloropyridylacetylenes produced in the present invention may suitably contain 1 to 4 chlorines and 1 to 3 acetylene groups. Preferred chloropyridylacetylenes have only one acetylene group, with the isomers of tetrachloropyridylacetylenes being especially preferred.

The starting perchlorinated vinylaromatic materials of the present invention may be conveniently prepared by the high temperature, vapor phase chlorination of the corresponding ethyl-substituted aromatic compound. For example, octachlorostyrene is prepared by the chlorination of ethylbenzene at 600° C.

In the electrolytic reduction of compounds of the present invention, chlorines on the aromatic nucleus are removed if reduction is continued beyond the removal of the halogens on the trichlorovinyl group. Thus, the original aromatic trichlorovinyl compound may be reduced to an aromatic acetylene compound having an aromatic nucleus with fewer chlorines than the original nucleus.

The concentration of the reactants in the electrolytic cell may vary widely as different reactants and solvents are employed in the reaction. As a general rule, reactant concentrations of about 0.01 to about 2 moles per liter of cell liquid are preferred, with about 0.1 to about 0.5 moles of reactant per liter of cell solution being especially preferred.

The design of the electrolysis cell used in the present invention is not critical. Numerous electrolytic cells known in the art may be readily employed in the present invention. Preferred electrolytic cells have cathodes of mercury, lead, iron, tin or zinc, with lead and mercury being especially preferred. The anode may be essentially any chemically inert material with graphite and platinum being especially preferred. Such preferred cell may be arranged in any conventional design.

The electrolyte used in the present invention may vary widely. Preferred electrolytes in the present invention are neutral salts, the salts of weak or strong acids, the salts of a weak base and weak or strong acids. The use of strong bases may be detrimental to the progress of the reaction because of the tendency of such electrolytes to substitute for the halogens. Specific examples of preferred electrolytes include sodium p-toluenesulfonate, sodium acetate, ammonium p-toluene-sulfonate, tetramethylammonium chloride, and hydrochloric acid, sulfuric acid, acetic acid or phosphoric acid used alone or in combination with ammonia or a tertiary amine. Especially preferred is the use of ammonium acetate, ammonium chloride or HCl as an electrolyte. The concentration of the electrolyte may vary widely as different electrolytes, current densities and cathode potentials are employed.

The solvent employed in the electrolysis solution may vary widely as different reactants are employed in the electrolytic dehalogenation. The solvent should dissolve all or most of the starting material and the electrolyte and should be inert under the electrolysis conditions. Solvents preferred in the present invention include the lower alcohols, dialkyl and alkylene ethers, lower alkylene glycol monoalkyl ethers and dialkyl ethers and lower amides. Representative examples of these preferred solvents include: alcohols such as methanol, ethanol, isopropanol and isobutyl alcohol; dialkyl ethers and alkylene ethers such as diethyl ether, dipropyl ether, dioxane and tetrahydrofuran; lower alkylene glycol monoalkyl ethers and dialkyl ethers such as 2-methoxy-propanol, ethoxyethanol, dimethoxyethane and 1,2-dimethoxypropane; and lower amides such as dimethyl-formamide and acetamide. These solvents of the present invention may be used either alone or preferably with up to about 30 percent by weight of water to assure proper solubility of the electrolyte.

In the operation of the electrolysis cell, the cathode potential is usually maintained between −0.5 and −2.5 volts versus the standard calomel electrode, with cathode potentials of −0.7 to −2.0 volts being especially preferred. The applied voltage provided by the power source may vary widely depending upon the IR drop of the reaction medium. The IR drop is preferably minimized to prevent overheating of the reaction cell. The current density may preferably range from about 0.01–0.5 amp./in.$^2$ of electrode with 0.05 to 0.15 amp./in.$^2$ being especially preferred. The temperature of the electrolysis reaction may vary widely. The temperatures may be varied to maintain the liquid phase with temperatures from about 0° to about 100° C. or more being preferred and temperatures of about 40° to about 60° C. being especially preferred.

The cell is usually and most conveniently operated at less than 100 percent conversion to minimize the over-reduction and dehalogenation of the product under the reaction conditions. As a general rule, 70 to 90 percent of the reduction theoretically required gives the most favorable yields of the desired product.

After the electrolysis, the product may be isolated by diluting the cell liquor with water and cooling the precipitated product. During the course of the reaction, a high concentration of reactants and products may be maintained in the electrolytic cell so that the product is crystallized from the cell liquor without the addition of water. Also after the termination of the electrolysis reaction, the solvent of the electrolytic cell may be distilled off, the crude product may be washed of inorganic salts and the product obtained by crystallization.

The acetylenic compounds prepared by the present invention have useful biological activity against rice blast; the triple bond may also be reduced to prepare the corresponding vinyl aromatic compounds which are useful in preparing fire retardant polymers.

Thus, by the process of the present invention, a convenient and inexpensive method of preparing the new chloropyridylacetylenes and other aromatic acetylenic compounds in high yields has been discovered using an electrolytic reduction of a trichlorovinylaromatic compound.

SPECIFIC EMBODIMENTS Example 1

An electrolysis cell was prepared using alternating plates of sheet lead as the cathode and graphite as the anode so that the total working areas of the cathode and anode were 75 square inches each. A saturated calomel reference electrode (SCE), magnetic stirring bar, thermometer and reflux condenser were also placed in the cell. When filled with solution, the electrolysis cell had a total volume of 2.5 liters. To this cell was added a solution of 70 grams (0.185 mole) of octachloro-styrene in a mixture of 1 liter of methanol and 1.2 liters of dimethoxyethane containing 20 ml. of concentrated aqueous ammonia. Also added to the cell were 150 grams of ammonium acetate as the electrolyte and 100 ml. of water. Electrolysis was conducted over a period of 2 hours applying a voltage of 10 volts to give a cathode potential of −1.2 volts vs. SCE and a current density of 0.15 amp. per square inch of electrode. During the course of electrolysis, the temperature rose to 60° C. The progress of the reaction was followed by taking periodic samples of the cell solution and analyzing them by vapor phase chromatography. The reaction was terminated after a conversion of 86 percent had been obtained. The current efficiency at this point was 80 percent for a transfer of 4 Faradays of electricity per mole of reactant. At the termination of the electrolysis, the analysis of the product showed that 13.6 percent was octachlorostyrene, 6.8 percent was 1,2-dichloro-1-(pentachlorophenyl)ethylene, 60.3% was pentachlorophenylacetylene and 19.3 percent was tetrachlorophenylacetylene. The hot reaction solution was drained from the cell and 250 ml. of water was added. After standing overnight at room temperature, buff-colored crystals formed. These crystals were collected and dried to give 26.4 grams (52.3% yield) of pentachlorophenylacetylene having a melting point of 180°–2° C. [lit. m.p. 185° to 186° C., J. Am. Chem. Soc. 83, 408 (1961)]. The product was also analyzed by elemental analysis, nuclear magnetic resonance spectroscopy and infrared spectroscopy.

EXAMPLES 2–5

In the same manner as described in Example 1, 70 grams (0.185 mole) of octachlorostyrene was electrolyzed in four parallel experiments in a solution of 100 ml. of water, 1 liter of methanol and 1.2 liters of dimethoxyethane containing the electrolyte concentrations shown in Table I. The cell was heated to 35° C. and 10 volts was applied to the cell giving a current flow of 10 amps. for a current density of 0.14 amp. per square inch of electrode. After 2 hours (about 20 amp. hours), the electrolysis was terminated and vapor phase chromatography was used to analyze the solution. The conditions and results of these four experiments at conversions of 80–90 percent are shown in Table I.

TABLE I.—ELECTROLYSIS OF OCTACHLOROSTYRENE

| Ex. | Electrode | Electrolyte, molar solutions | Yield, percent | |
|---|---|---|---|---|
| | | | $C_6Cl_5=CH$ | $C_6HCl_4C=CH$ |
| 2 | Hg | 1.0 NH$_4$OAc | 34.6 | 9.9 |
| 3 | Pb | 1.0 NH$_4$OAc, .13 NH$_3$ | 69.8 | 22.4 |
| 4 | Pb | 0.5 NH$_4$Cl | 80.2 | 2.2 |
| 5 | Pb | 0.1 HCl | 69.2 | 7.1 |

EXAMPLE 6 - REDUCTION OF 2-TRICHLOROVINYL-3,4,5,6-TETRACHLOROPYRIDINE

In a lead cell having a cathode surface area of 14 square inches, a solution of 8 grams (0.023 mole) of 2-trichlorovinyl-tetrachloropyridine in 100 ml. of methanol and 120 ml. of dimethoxyethane containing 15 grams of ammonium acetate, 2 ml. of concentrated aqueous ammonia, and 10 ml. of water was electrolyzed in the manner shown by the examples above. When analysis of a sample by vapor phase chromatography indicated that 81% conversion had been obtained, the electrolysis was terminated and the reaction solution was diluted with water and extracted with methylene chloride. Upon evaporation of the methylene chloride extract, 6.5 grams of a crude oily solid were obtained. The major product, 50.6 percent, was identified as shown in Example 1 to be 3,4,5,6-tetrachloropyridylacetylene which had a melting point of 108° to 111° C. A secondary product, 13 percent, was identified as trans-1-chloro-2-(3,4,5,6-tetrachloropyridyl) ethylene and had a melting point of 116° to 121° C.

EXAMPLE 7 - REDUCTION OF 3-TRICHLOROVINYL-2,4,5,6-TETRACHLOROPYRIDINE

In the same manner as described in Example 3, 8.0 grams (0.023 mole) of 3-trichlorovinyl tetrachloro-pyridine was electrolyzed to give a crude product at a conversion of 73 percent at a current efficiency of 40 percent. The major product, 50.7 percent, was identified in the same manner as shown above to be 2,4,5,6-tetrachloropyridylacetylene, off-white crystals having a melting point of 85° to 88° C.

EXAMPLE 8

Rice plants were wetted with a 400 p.p.m. aqueous suspension of pentachlorophenylacetylene. The treated plants and a standard were then inoculated with rice blast. The plants were then stored in conditions suitable for infection and development of the disease. After the disease was well developed, the treated plants were compared to an untreated standard. The treatment with pentachlorophenylacetylene gave 83 percent control of rice blast, whereas the standard showed no control.

Also, any of the novel acetylenic compounds taught above may be used to control rice blast as described in Example 8, for example, tetrachloropyridylacetylene may be applied to rice plants to control rice blast.

We claim:

1. A chloropyridylacetylene compound of the formula

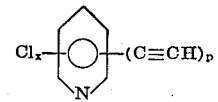

where *p* is an integer of 1–3
and *x* is an integer of 1 to (5–*p*).

2. The compound of claim 1 wherein *p*=1.

3. The compound of claim 1 which is a tetrachloropyridylacetylene.

4. The compound of claim 1 which is 3,4,5,6-tetrachloropyridylacetylene.

5. The compound of claim 1 which is 2,4,5,6-tetrachloropyridylacetylene.

* * * * *